United States Patent Office 3,429,940
Patented Feb. 25, 1969

1

3,429,940
TRIMETHYL CYCLODODECATRIENE PROCESS
Francis T. Wadsworth, Trenton, N.J., assignor to Columbian Carbon Company, New York, N.Y., a corporation of Delaware
No Drawing. Continuation-in-part of application Ser. No. 556,571, June 10, 1966, now Patent No. 3,336,701. This application Aug. 28, 1967, Ser. No. 663,554
U.S. Cl. 260—666                                    15 Claims
Int. Cl. C07c 3/10, 3/60, 3/12

ABSTRACT OF THE DISCLOSURE

Processes are described for the polymerization or oligomerization of ethylenically unsaturated monomers at moderate temperatures and pressures in the presence of novel coordination catalysts derived from a chromium compound, such as chromic acetylacetonate; a reducing agent, such as triethyl aluminum; and an aliphatic halide, such as t-butyl chloride. The preparation of such catalysts and their use to convert alpha-monolefins, such as ethylene, to high molecular weights solid polymers and to convert open chain conjugated aliphatic dienes, such as 1,3-butadiene, isoprene and piperylene, to large ring cyclic trimers is illustrated.

CROSS-REFERENCE TO RELATED APPLICATIONS

This application is a continuation-in-part of my application Ser. No. 556,571, filed June 10, 1966, now U.S. Patent No. 3,366,701, issued Jan. 30, 1968.

BACKGROUND OF THE INVENTION

Field of the invention

This invention relates to the oligomerization of conjugated methyl butadienes in the presence of novel chromium coordination catalysts. More specifically, it relates to the production of trimethyl-1,5,9-cyclododecatrienes by contacting isoprene or piperylene with a composition derived from three essential components; i.e. (1) a chromium compound component in which chromium is present in a positive valence state, (2) a hydrocarbyl aluminum component and (3) an aliphatic halide.

Description of the prior art

The use of chromium coordination catalysts to polymerize ethylenically unsaturated monomers is well known. Effective catalysts of this type have been prepared by reacting a chromium compound, such as chromium triacetyl-acetonate or chromyl chloride, with any of a wide variety of cocatalysts, including metals of Groups I–A, II–A, and III–A and organometallic or hydride compounds of these metals and boron. This reaction, in which the cocatalyst is believed to function as a reducing agent for the chromium compound, has generally been carried out in a hydrocarbon medium in order to expedite the development of the catalytically active interaction product. Although the use of such catalysts immediately after admixing the components has been described in the prior art, the usual procedure has been to permit the mixture to age for periods of from fifteen minutes to several hours in order to obtain maximum catalyst efficiency. Following the aging period, the polymerization reaction has been conducted simply by contacting the catalyst with an ethylenically unsaturated monomer or mixture of monomers at atmospheric or slightly elevated pressure and at room temperature or moderately elevated temperatures. Although such procedures have been known for a number of years, their widespread commercial utilization has been hampered by the extreme sensitivity of these catalysts to impurities often found in both solvent and monomer. Often, these impurities are present in extremely low concentration and are not detected until a batch of catalyst fails to develop properly during a standard aging period or a rapid decrease in the polymerization rate is experienced. In addition, polymer product obtained in the use of these prior art catalysts is generally characterized by the presence of materials having a wide range of molecular weights, which reduces the yield of desired product and may necessitate expensive and often difficult product purification procedures. In the case of lower alpha olefin polymerizations, a significant portion of the monomer may be converted to low molecular weight oily polymers which are not suitable for extrusion and for which there is a limited market demand. Similarly, when these prior art catalysts are used in the production of cyclic trimers from conjugated aliphatic dienes, a large proportion of the monomer is converted to undesirable products, such as low molecular weight solid polymer, linear oligomers and cyclic dimers.

SUMMARY OF THE INVENTION

A principal object of this invention is to provide an improved process, which is relatively free of the aforementioned disadvantages of the similar prior art processes, for selectively converting unsaturated monomers to polymeric products having a narrow molecular weight range. Another object is to provide a highly active catalyst system which is relatively insensitive to the low concentrations of impurities which are found in commercially available solvents and monomers. A specific object of this invention is to provide a process for producing high yields of 1,5,9-cyclododecatrienes from conjugated aliphatic dienes.

It has now been found that these objects and other features of advantage, which will be apparent from the consideration of the following detailed process description, can be achieved by operation in accordance with this invention.

It has been discovered that any organic monomer or mixture of monomers, which has been used as a feedstock in the prior art polymerization processes employing chromium coordination catalysts, can be selectively polymerized or oligomerized by contacting such monomeric material under conventional polymerization conditions with a unique catalyst which is the interaction product of a hydrocarbyl aluminum compound, an aliphatic halide and a chromium compound. Although any one or combination of these polymerizable monomers responds favorably to these novel catalysts, the magnitude of the improvement that can be effected in the cyclooligomerization of conjugated butadienes is outstanding. Similarly, although one may select any chromium compound in which chromium is present in a positive valence state or any hydrocarbyl aluminum compound for the preparation of the catalyst, the well known physical and chemical characteristics of certain compounds within these groups, such as the low hydrocarbon solubility of many inorganic chromium salts, may render them less desirable than others for certain commercial applications. For convenience, this invention will be described below primarily in reference to catalyst components and procedures which have been found to be particularly well suited to the cyclic oligomerization of 1,3-butadienes to produce cyclododecatrienes.

DESCRIPTION OF THE PREFERRED EMBODIMENTS

The catalyst compositions which have been found to be particularly useful for such cyclooligomerization reactions are derived from (a) a chromium compound component selected from the group consisting of chromium carboxylates, esters and chelates,
(b) an aliphatic hydrocarbyl halide component, and
(c) an aluminum compound and component of the formula $$(R^1)(R^2)(R^3)Al$$

wherein $R^1$ is a hydrocarbyl radical and $R^2$ and $R^3$ are each selected from the group consisting of hydrogen, $R^1$ and $OR^1$.

Exemplary of the chromium compounds which are preferred for these cyclooligomerization reactions are chromic acetate, chromous oxylate, chromic benzoate, chromic ethylhexanoate, chromic naphthanate, triphenyl chromium, chromic acetylacetonate, chromic benzoylacetonate and chromic hydroxyacetate. Because of their solubility properties, the use of chromium chelates, such as chromic acetylacetonate, is especially preferred.

The aliphatic halide catalyst components which are useful in this invention may be either saturated or ethylenically unsaturated and may have either a straight or branched chain structure. Representative of such suitable compounds are methyl chloride, isopropyl chloride, n-butyl chloride, tert.-butyl chloride, tert.-butyl bromide, tert.-butyl iodide, n-octyl chloride, cyclohexyl chloride, allyl chloride, diphenyl methyl chloride, and ethylene chloride. Aliphatic halides containing vinyl unsaturation, such as vinyl chloride and chloroprene, are suitable catalyst components; however, these materials are themselves readily polymerized and their use in a continuous process may result in the accumulation of solid polymer on the walls of the reactor. In general, most satisfactory results in a continuous reaction are obtained with the use of tertiary aliphatic chlorides and bromides which are free of ethylenic unsaturation; e.g. tert-butyl chloride, 1,1-dimethylchloropropane and triphenylmethyl bromide.

The quantity of aliphatic halide used as a catalyst component is a critical feature of this invention. If the atomic ratio of halogen to chromium in the catalyst components is below about 2.5:1, the catalyst may exhibit certain of the characteristics of the similar prior art catalysts. It is to be understood that many of the advantages described above for the catalysts of this invention may, nevertheless, be realized at halogen to chromium ratios as low as about 1:1 or lower; however, the maximum advantage of using these catalysts is obtained at ratios of about 3:1 to about 20:1. It is very important that this ratio not greatly exceed about 25:1, as the use of solvent quantities of aliphatic halide has been found to rapidly deactivate the catalyst system.

Aluminum compounds of the formula $(R^1)(R^2)(R^3)Al$ which are preferred components of the catalyst of this invention are represented by trimethyl aluminum, triisobutyl aluminm, triphenyl aluminum, diethyl aluminum hydride and ethoxyaluminum diethyl. Of this group, the trihydrocarbyl aluminum compounds, such as triethylaluminum, are especially preferred.

The quantity of such aluminum compounds which may be used can be varied over a wide range. In general, it is preferred that the atomic ratio of aluminum to halogen in the catalyst components be maintained at from about 1:1 to about 5:1, although both higher and lower ratios may be useful. Particularly active catalyst compositions may be produced by adjusting the quantities of the catalyst components so that from about 4 to 8 atoms of halogen and from about 8 to about 15 atoms of aluminum are present per atom of chormium.

The catalyst components may be interacted in the presence or absence of a solvent; however, it is preferable to utilize an inert reaction medium to facilitate temperature control within the limits discussed below. Typical of such inert media are the liquid saturated aliphatic hydrocarbons, n-hexane, isooctane and cyclohexane; the cyclic ethers, dioxane and tetrahydrofuran; the aromatic hydrocarbons, benzene, toluene and xylene; and the ring halogenated aromatics, chlorobenzene and chlorotoluene. The use of benzene or toluene is greatly preferred. The catalyst components may be admixed and stored for considerable periods of time prior to use or the admixture may be effected immediately prior to use. It is also possible and often advantageous to prepare the catalysts of this invention in the presence of ethylenically unsaturated hydrocarbons, such as butadiene, isoprene, piperylene, a cyclododecatriene or a portion of the unquenched reaction product of a previous butadiene cyclooligomerization reaction. When the unsaturated monomers utilized in such pre-seeding technique are readily polymerized at catalyst development temperatures and are different than the monomer to be polymerized, it is generally preferable that they be present in only catalytic quantities or that they be admixed with both the chromium and the aliphatic halide catalyst components prior to the addition of the hydrocarbyl aluminum compound.

The temperature at which the catalyst is prepared must not be permitted to greatly exceed about 125° C., as prolonged exposure to higher temperatures rapidly decreases catalytic activity. Suitably low temperatures may be maintained by external cooling of the mixture to as low as about 0° C. or lower or, in a preferred embodiment of this invention, by the simple expedient of slowly admixing the hydrocarbyl aluminum compound with the other catalyst components in an inert reaction medium.

Any order of addition of the catalyst components may be used; however, it has been found that catalysts produced by adding the aluminum compound to a mixture of the chromium compound and aliphatic halide components exhibit a significantly greater activity and selectivity than those produced when the last added component is the aliphatic halide. Similarly, the catalysts obtained when the aliphatic halide is the last added component are superior to those in which the chromium compound is added last. This evidence and there are structural differences among the catalyst compositions resulting from the various orders of addition has been confirmed by infra-red spectographic analyses, which likewise reveal significant differences in both freshly prepared catalysts and those which have been aged for up to twenty four hours.

The oligomerization of open-chain conjugated aliphatic monomers, such as butadiene, isoprene or piperylene, in the presence of the novel catalysts described above, may be conducted over a wide temperature range. Because of rapid catalyst decomposition at temperatures above about 125° C., it is generally preferable to operate at a lower temperature, down to 0° C. or lower. Inasmuch as satisfactory results can be achieved at from about room temperature to about 100° C., there is no advantage of operating at either the high or low end of the operable range.

Similarly, such cyclooligomerization reactions may be conducted under pressures ranging from sub-atmospheric up to 100 atmospheres or higher; however, more moderate pressures have been found to be equally satisfactory. When the reaction is conducted in the absence of solvent or with insufficient solvent to dissolve significant amounts of a monomer which under atmospheric pressure and reaction temperature is in the vapor phase, it is, of course, preferred to utilize elevated pressures. Thus, for example, in the cyclooligomerization of butadiene, isoprene or piperylene at a temperature of from about 25°

C. to 100° C., superior results are obtained by operating under pressures from about 30 p.s.i.g. to about 100 p.s.i.g. and maintaining this pressure during the course of the reaction by introducing additional monomer as the monomeric material in the reactor is depleted.

The quantity of catalyst used in the process of the invention likewise may be varied over a wide range. In general, these catalysts are effective in amounts containing less than about 0.05 millimole of chromium to as much as 1 mole or more per mole of diene. In continuous reactions or semi-batch reactions (in which the diene is added on demand), the mole ratio of catalysts to unreacted monomer is generally considerably higher than in a batch reaction.

It is essential that precautions be taken to protect the catalysts of this invention, both prior to and during use, from contact with excessive quantities of water, alcohol, carbon dioxide, oxygen and other materials which are known to be reactive with hydrocarbyl aluminum compounds. Small quantities of such reactive impurities are, of course, tolerable. It is, however, preferred that they be essentially excluded, particularly prior to admixture of the catalyst components, in order to achieve maximum efficiency.

The numerous advantages inherent in the instant invention will be evident from an examination of the following comparative examples. Examples 1 through 3, 5 through 8 and 12 through 15 are conducted in accordance with this invention, whereas Examples 4 and 9 through 11 are illustrative of similar procedures falling outside the scope of this inventive concept.

Example 1

A clean, dry magnetically stirred autoclave is evacuated and charged with 140 grams of dry benzene and heated, with stirring, to 80° C. A solution of 1 gram of chromium (III) acetylacetonate in 10 grams of benzene and 1.5 grams of tertiary butyl chloride are introduced into the reactor and stirred for about 1 minute. A total of 19 grams of 20 wt. percent triethylaluminum in benzene is then added in increments of 2 grams, 5 grams and 12 grams over a two minute period. During this incremental addition, the temperature of the autoclave contents rises to about 85° C. Heat is then applied and butadiene introduced to raise the autoclave pressure from 12 p.s.i.g. to 60 p.s.i.g. Additional butadiene is introduced on demand and the autoclave maintained at 90° C. and 60 p.s.i.g. for an hour and a half. A total of 560 grams of butadiene is introduced during this period. The butadiene flow is then terminated and the autoclave contents agitated for an additional ten minutes at 90° C., at which point the pressure drops to 35 p.s.i.g. After venting unreacted gases, three 100 gram portions of the liquid content of the autoclave are withdrawn. The entire remaining content of the autoclave is poured into 150 milliliters of methanol to quench the catalyst. No observable high polymer is precipitated during this quenching operation. Analysis of the product shows a 95% conversion of butadiene with a cyclododecatriene selectivity of 92.8%, for a cyclododecatriene yield of 88.2%.

Example 2

The procedure of the preceding example is repeated utilizing, in place of the initial benzene charge to the autoclave, 100 grams of the unquenched reaction product of Example 1. The butadiene conversion amounts to 97% with a cyclododecatriene selectivity of 90.5%.

Example 3

The procedure of the preceding example is repeated except that the introduction of tertiary butyl chloride is delayed until immediately following the incremental addition of the triethyl aluminum solution. Butadiene conversion is 90% with a cyclododecatriene selectivity of 77%. The reaction rate, as measured by butadiene demand is slightly more than half of that of Example 2.

Example 4

The procedure of Example 2 is repeated omitting the addition of tertiary butyl chloride. The cyclooligomeric product is predominantly vinylcyclohexene.

Example 5

The procedure of Example 1 is repeated except that 1.4 grams of allyl chloride are substituted for the tertiary butyl chloride. Butadiene conversion is 95% with a cyclododecatriene selectivity of 84.75%.

Examples 6–11

In each of Examples 6–11, a clean, dry magnetically stirred autoclave is flushed with argon and charged with 150 milliliters of dry benzene and the materials shown in Table 1. In each case the aluminum compound is introduced last as a solution in 15 ml. of toluene and its addition is incremental over a period of five minutes. Following the addition of these materials, heat is applied and butadiene continually added so as to maintain the autoclave at 85° C. and 55 p.s.i.g. After one hour, the butadiene flow is stopped and the autoclave permitted to cool to room temperature. The product is worked up as in Example 1.

Example 12

A clean dry magnetically stirred autoclave is flushed with nitrogen and charged with a solution of 2.85 millimoles of chromium (III) acetylacetonate and 17.2 millimoles of t-butyl chloride in 100 grams of dry benzene. The solution is heated, with stirring, to 40° C. and a solution of 34.4 millimoles of triethyl aluminum in 50 grams of dry benzene is added slowly over a five minute period raising the temperature to 44° C. Additional heat is then applied to increase the temperature to 50° C. and isoprene introduction is begun. The autoclave is held at this tem-

TABLE 1

| Example | Cr compound | Al compound | Halide | BD conversion, percent | CDT selectivity percent |
|---|---|---|---|---|---|
| 6 | Chromium naphthenate (2.8 mmol. of chromium). | Triisobutyl aluminum (22.5 mmol). | Allyl bromide (10 mmol) | 88 | 77.2 |
| 7 | Triphenyl chromium (3 mmol). | Diethyl aluminum hydride (25 mmol). | Triphenyl methyl chloride (10 mmol) | 90 | 69 |
| 8 | Chromium tri-hydroxyacetate (3 mmol). | Triethyl aluminum (30 mmol). | 2-chlorobutane (15 mmol) | 75 | 79 |
| 9 | Chromium tri-acetylacetonate (3 mmol). | Triethyl aluminum (12 mmol). | Tert-butyl chloride (100 mmol) | Low | 0 |
| 10 | do | Triethyl aluminum (45 mmol). | Chloro-benzene (12 mmol) | 89 | (1) |
| 11 | do | Triethyl aluminum (22.5 mmol). | Acetyl chloride (12 mmol) | 60 | (2) |

1 Trace (cyclooligomeric product primarily vinylcyclohexene).
2 Trace (product predominantly solid polymer).

perature and is maintained at 60 p.s.i.g. by the addition of isoprene on demand for four hours. The flow of isoprene is then terminated, the autoclave cooled and vented and the product worked up as in Example 1. Analysis of the converted isoprene, which is free of solid polymer, shows 43% of a mixture of 1,5,9- and 2,5,9-trimethyl-1,5,9-cyclododecatrienes with lesser quantities of 1,5- and 1,6-dimethyl-1,5-cyclooctadienes and dipentene.

Example 13

The procedure of the preceding example is repeated except that the autoclave is flushed with butadiene instead of nitrogen and a butadiene partial pressure of 8 p.s.i. is maintained during the addition of the triethyl aluminum. This butadiene is vented prior to the introduction of isoprene. A mixture of 1,5,9- and 1,6,9-trimethyl-1,5,9-cyclododecatrienes comprises over 50% of the converted isoprene product.

Example 14

The procedure of Example 13 is repeated using piperylene in place of isoprene and t-butyl bromide in place of t-butyl chloride, producing a high yield of a mixture of 3,7,11- and 3,4,11-trimethyl-1,5,9-cyclododecatrienes.

Although the process of this invention has been described primarily in reference to the production of cyclic trimers of conjugated dienes, it is to be understood that it applies equally well to the polymerization of other polymerizable monomers, such as the alpha olefins, ethylene, propylene and styrene, as well as the production of interpolymers of such ethylenically unsaturated monomers. When applied to a polymerization system containing one or more monomers which do not contain conjugated double bonds, the catalyst system described above is highly selective for the production of solid polymers or interpolymers having an unusually narrow molecular weight distribution. The average molecular weight of these polymers has been found to be directly related to the aluminum to chromium ratio utilized. The use of ratios of from about 10 to 1 to a high as about 100 to 1 have been found to be particularly useful in the preparation of extremely high molecular weight polymers. The following example is illustrative of the use of such catalyst to prepare a high density polyethylene having virtually no methyl substitution.

Example 15

A 300 milliliter magnetically stirred autoclave is flushed with argon and charged with 105 milliliters of dry benzene, 3 millimoles of chromium tribenzoylacetonate and 30 millimoles of allyl chloride. A solution of 75 millimoles of triethylaluminum in 40 milliliters of benzene is then added slowly over a period of 10 minutes, the autoclave heated to 65° C. and ethylene pressured in at 400 p.s.i.g. The ethylene pressure is maintained between 315 and 400 p.s.i.g. for one hour, at which time the reactor is cooled, vented and the catalyst deactivated by pouring the entire autoclave contents into 50 milliliters of a 10 percent by weight solution of hydrogen chloride in methanol. The solid polymer product is separated by filtration, shredded and washed successively with heptane, additional methanolic hydrogen chloride and methanol. The residue is then dried under vacuum for four hours at 80° C. to yield a solid white polymer containing less than 1 methyl group per thousand carbon atoms.

I claim:
1. Oligomerization process comprising contacting a conjugated methyl butadiene with a catalyst composition consisting essentially of
   (a) a chromium compound component in which the chromium is present in a positive valence state,
   (b) an aliphatic hydrocarbyl halide component selected from the group consisting of aliphatic chlorides, bromides and iodides, and
   (c) a hydrocarbyl aluminum component,
wherein the atomic ratio of halogen to chromium in said components is from about 1 to about 25.

2. The process of claim 1 wherein said conjugated methyl butadiene is isoprene.

3. The process of claim 1 wherein said conjugated methyl butadiene is piperylene.

4. Process for the production of oligomers of a conjugated methyl butadiene selected from the group consisting of isoprene and piperylene comprising contacting said methyl butadiene with a catalyst composition consisting essentially of
   (a) a chromium compound component selected from the group consisting of chromium carboxylates, esters, and chelates,
   (b) an aliphatic hydrocarbyl halide component selected from the group consisting of saturated and ethylenically unsaturated aliphatic chlorides, bromides and iodides, and
   (c) an aluminum compound component of the formula $(R^1)(R^2)(R^3)Al$, wherein $R^1$ is a hydrocarbyl radical and $R^2$ and $R^3$ are each selected from the group consisting of hydrogen, $R^1$ and $OR^1$,
wherein the atomic ratio of halogen to chromium in said catalyst components is from about 1 to about 25.

5. The process of claim 4 wherein the atomic ratio of halogen to chromium in said catalyst components is from about 3 to about 20.

6. The process of claim 4 wherein the aluminum to halogen atomic ratio to said catalyst components is from about 1 to about 5.

7. The process of claim 5 wherein said catalyst composition is produced by adding said aluminum compound to a mixture of said chromium compound and said aliphatic halide at a temperature below about 125° C.

8. The process of claim 7 wherein said catalyst is formed in contact with trimethyl cyclododecatriene-1,5,9.

9. The process of claim 7 wherein said catalyst is formed in contact with a conjugated aliphatic diene selected from the group consisting of 1,3-butadiene, isoprene and piperylene.

10. The process of claim 5 wherein the reaction is conducted under an elevated pressure up to about 100 p.s.i.g.

11. The process of claim 10 wherein said elevated pressure is maintained during the oligomerization reaction by the introduction of additional conjugated methyl butadiene.

12. The process of claim 5 wherein said halide component is a tertiary alkyl halide.

13. The process of claim 5 wherein said halide component is an allyl halide.

14. The process of claim 4 wherein said chromium compound is chromium acetylacetonate.

15. The process of claim 4 wherein said aluminum compound is triethyl aluminum.

References Cited

UNITED STATES PATENTS

| | | | |
|---|---|---|---|
| 3,366,701 | 1/1968 | Wadsworth | 260—666 |
| 2,979,543 | 4/1961 | Wilke | 260—666 |
| 3,008,943 | 11/1961 | Guyer | 260—93.7 |
| 3,083,246 | 3/1963 | Holzman | 260—683.15 |
| 3,167,593 | 1/1965 | Mueller | 260—666 |
| 3,231,627 | 1/1966 | Royston | 260—666 |
| 3,326,990 | 6/1967 | Clark | 260—666 |

FOREIGN PATENTS 921,954   3/1963   Great Britain.

DELBERT E. GANTZ, *Primary Examiner.*

V. O'KEEFE, *Assistant Examiner.*

U.S. Cl. X.R.

260—94.9